United States Patent
Westermann et al.

(10) Patent No.: US 6,301,741 B1
(45) Date of Patent: Oct. 16, 2001

(54) SUPPORT FOR THE JOINT HINGE OF A WIPER BLADE

(75) Inventors: Klaus-Juergen Westermann, Karlsbad (DE); Eric Pollaris, Meeuwen-Gruitrook (BE); Andreas Strauss, Herxheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/319,804
(22) PCT Filed: Oct. 8, 1998
(86) PCT No.: PCT/DE98/02968
  § 371 Date: Nov. 26, 1999
  § 102(e) Date: Nov. 26, 1999
(87) PCT Pub. No.: WO99/20501
  PCT Pub. Date: Apr. 29, 1999

(30) Foreign Application Priority Data

Oct. 16, 1997 (DE) .............................................. 197 45 846

(51) Int. Cl.[7] ...................................................... B60S 1/40
(52) U.S. Cl. ........................................................ 15/250.32
(58) Field of Search .......................... 15/250.32, 250.31, 15/250.351

(56) References Cited

U.S. PATENT DOCUMENTS 5,611,103 * 3/1997 Lee ..................................... 15/250.32

FOREIGN PATENT DOCUMENTS

| 3311303 | * | 10/1983 | (DE) . |
| 259.823 | * | 9/1988 | (DE) . |
| 234525 | * | 2/1987 | (EP) . |
| 655373 | * | 5/1995 | (EP) . |

\* cited by examiner

Primary Examiner—Gary K. Graham
(74) Attorney, Agent, or Firm—Michael J. Striker

(57) ABSTRACT

Bearing part (30) for an articulation of a wiper blade (10) at a hook-shaped end (20) of a wiper rod (18) of a windshield wiper, which bearing part (30) can be placed on a bearing pin (28) of the wiper blade (10) with a hub (36) which is open along a portion of its circumference and is introduced into the hook-shaped end (20) and held by the hook-shaped end (20) in assembled state via contact faces (60, 62, 64, 66, 68) and catch means (50, 52, 88, 90, 92), characterized in that an elongated base body (40) has two arms (42, 44) which are arranged diametrically relative to the hub (36) held in the hub (30) so as to be rotatable coaxial to the hub (36) in a holding clip (46) whose side walls (48, 50) project in the longitudinal direction (38) over lateral surfaces of the base body (40) and are connected with one another by at least one crosspiece (50, 52), wherein the arms (42, 44) are constructed in different ways for receiving wiper rods (18) with different hook-shaped ends (20).

10 Claims, 4 Drawing Sheets

SUPPORT FOR THE JOINT HINGE OF A WIPER BLADE

BACKGROUND OF THE INVENTION

The invention is based on a bearing part for the articulation of a wiper blade.

Known windshield wipers have a wiper arm which is constructed from a fastening part and, articulated thereon, a joint part with a wiper rod. Further, they have a wiper blade formed of a carrying clip system with a primary center clip and secondary intermediate clips connected with the latter in an articulated manner, as well as claw clips and a wiper strip. The wiper blade is articulated at the wiper arm in that a hook-shaped end of the wiper rod holds a bearing part which is arranged between two side cheeks of the center clip and engages an articulated pin of the center clip by a hub which is open along a circumferential area. The joint formed in this way guides the wiper blade during the swinging motion over the windshield, wherein the joint and the carrying clip system make it possible for the wiper strip to be adapted to a curvature of the windshield.

While the wiper arm is generally constructed in a vehicle-specific manner and, in practice, does not wear out over service life, the wiper blade wears especially at the joints and at the wiper strip, so that it must be changed more frequently during the life of the vehicle. In this connection, as a rule, not only the wiper strip, but the entire wiper blade which is commercially available is changed.

In order to reduce the quantity of wiper blade types, there are included in the packaged wiper blades bearing parts made of plastic which have different receiving devices for the wiper rod and which therefore make it possible to use the same wiper blade with wiper rods having different material thicknesses and widths as well as different bending radii and catch elements. The user chooses from the available bearing parts the appropriate bearing part for his vehicle and throws away the rest. The excess bearing parts increase the size of the wiper blade packaging and lead to increased waste. Further, the transport and storage volume is increased.

EP 0 234 525 B1 discloses a bearing part of the above-mentioned type which has a crosspiece which is offset in the longitudinal direction relative to the open hub and serves as means for fixing in the longitudinal direction when the bearing part is mounted at the hook-shaped end of the wiper rod. For this purpose, the crosspiece is at a distance from the axis of rotation of the hub, which distance corresponds to the outer bending radius of the hook-shaped end of the wiper rod. Therefore, the wiper rod does not need a catch hole for securing the bearing part longitudinally. The bearing part is accordingly suited for wiper rods with or without catch holes.

Further, a similar bearing part is known from EP 0 655 373 A1. This bearing part has two crosspieces arranged at an offset in the longitudinal direction relative to the hub and serve as means for longitudinally securing a hook-shaped end of a wiper rod; specifically, the crosspiece lying closest to the axis of rotation serves for a hook-shaped end with a smaller bending radius and the other crosspiece serves for a hook-shaped end with a greater bending radius. The hook-shaped end with a greater bending radius contacts, by its bent inner surface, a correspondingly shaped contact face of the first crosspiece. This bearing part is accordingly suitable for wiper rods whose hook-shaped ends have two different bending radii. In order to prevent rotation of the bearing part relative to the wiper rod, it has an additional crosspiece and a catch projection arranged at an offset relative to the hub. The wiper rod snaps in between the crosspiece and catch projection when assembled.

SUMMARY OF THE INVENTION

According to the invention, the bearing part has an elongated base body having two arms which are arranged diametrically opposite relative to the hub and is held in a holding clip so as to be rotatable coaxial to the hub. Accordingly, the base body can be swiveled relative to the holding clip and a hook-shaped end of a wiper rod can be drawn over an arm of the base body and then swiveled back into the initial position. Since the arms are constructed differently, the bearing part is suitable for at least two different hook-shaped ends of the wiper rods.

In order to be able to use hook-shaped ends with bending radii of different magnitudes, the arms of the base body have at least two parallel contact faces which extend in the longitudinal direction and are contacted by the legs of the hook-shaped end, wherein the distance of the contact faces from one another varies. In this respect, an arm can have a plurality of contact faces which are formed on the one hand by the circumferential contour of the arm and on the other hand by cutouts in the arm of the base body. The bearing part is accordingly suitable for wiper rods with more than two different hook-shaped ends.

The hook-shaped ends are guided in the bearing part lateral to the contact faces, e.g., through lateral guides at the side walls of the holding clip and/or through lateral guides at the base body. The lateral guides, to which are allocated two contact faces, can have different distances from one another, so that they are suitable for hook-shaped ends of different width.

The hook-shaped ends of the wiper rod can have conventional catch elements, e.g., a catch hole, which cooperates with a catch projection at the corresponding contact face. However, in order to be able to assemble wiper rods irrespective of the position or the existence of a catch hole, it is advantageous when the hook-shaped end is fixed in the longitudinal direction between a longitudinal stop at the base body and an axial stop at the holding clip. The distance between these stops is adapted to the associated hook-shaped end of the wiper rod in such a way that the outer bending area of the hook-shaped end contacts the axial stop of the holding clip when the wiper blade is assembled. The longitudinal stop at the base body can be formed by curved end pieces of the arms of the base body which contact the inner bending area of the hook-shaped end of the wiper rod or by stops at the end of a contact face contacted by the front side of the short leg of the hookshaped end.

The axial stop of the holding clip is formed in a simple manner by a crosspiece at the short side of the side walls. A catch tongue ensures that the hookshaped end locks in the assembled position. Since the base body is rotatable relative to the holding clip, one axial stop is generally sufficient. However, in order to reinforce the holding clip, a second axial stop in the form of a crosspiece at the opposite end is advantageous. In this case, if the axis of rotation of the bearing part is situated off-center with respect to the two crosspieces or axial stops of the holding clip, other variants of the hook-shaped ends of wiper rods, e.g., with respect to the material thickness, can be taken into consideration by means of the central offset.

BRIEF DESCRIPTION OF THE DRAWINGS

Further advantages are indicated in the following description relating to the drawings. The drawings show an embodiment example of the invention. The drawing, description and claims contain numerous features in combination. The person skilled in the art will advisably also consider the features individually and together to form useful additional combinations.

DESCRIPTION OF THE PREFERRED EMBODIMENTS

Figure 1:
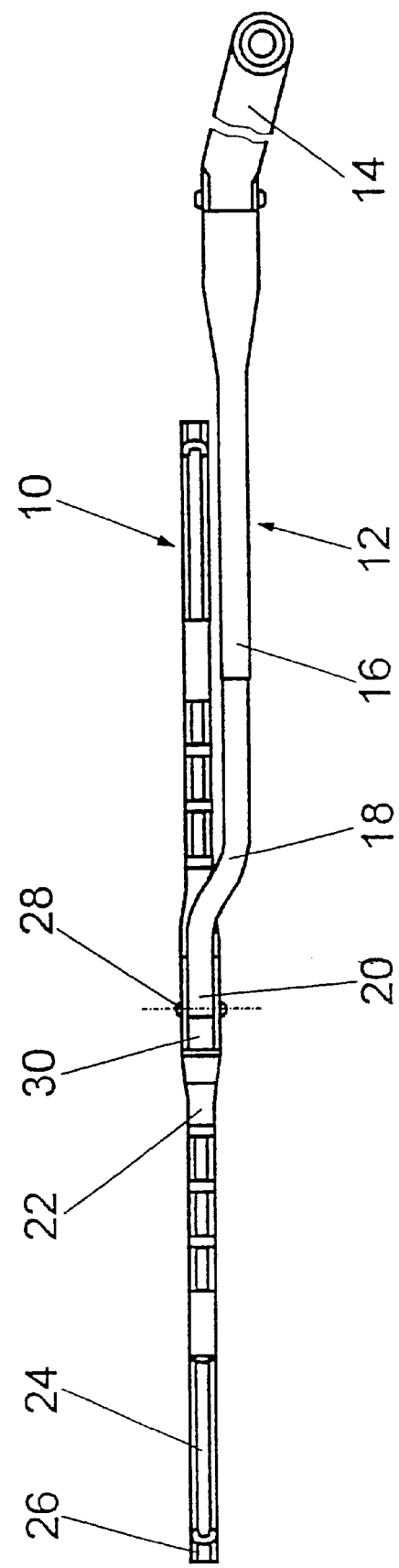
FIG. 1 shows a top view of a windshield wiper.
Figure 5:
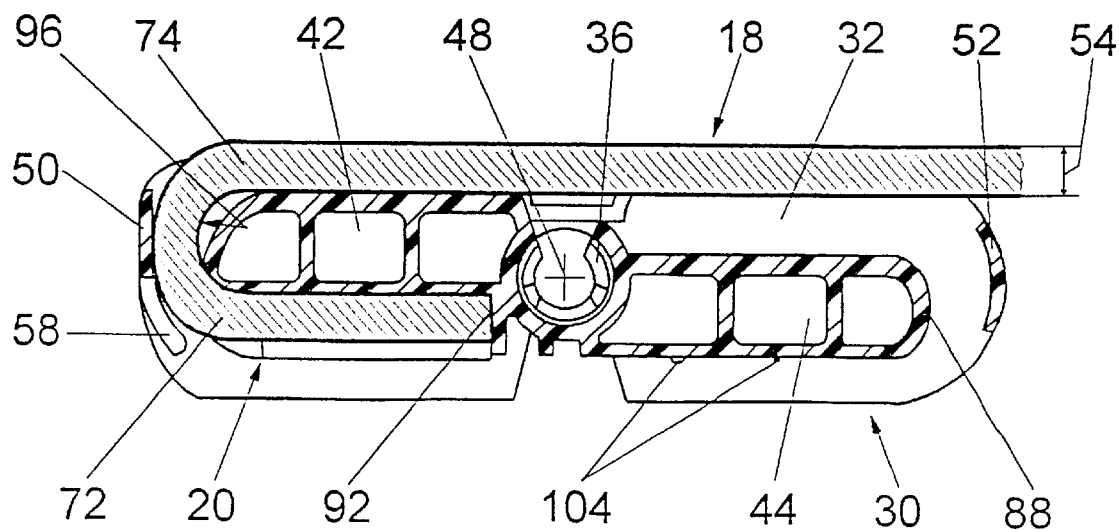
FIG. 5 shows a longitudinal section corresponding to FIG. 4 with a bearing part in assembled position.

The windshield wiper shown in FIG. 1 has a wiper arm 12 with a fastening part 14 and a joint part 16 to which a wiper rod 18 is fastened. The joint part 16 and the wiper rod 18 can also be constructed in one piece. The wiper rod 18 holds, by its hook-shaped end 20 (FIG. 5), a bearing part 30 which is arranged between side cheeks of a center clip 22 and grasps a bearing pin 28 of the center clip 22 with an open hub 36. The center clip 22 is part of a wiper blade 10 whose wiper strip 26 is connected in an articulated manner with the center clip 22 by claw clip 24.

Figure 2:
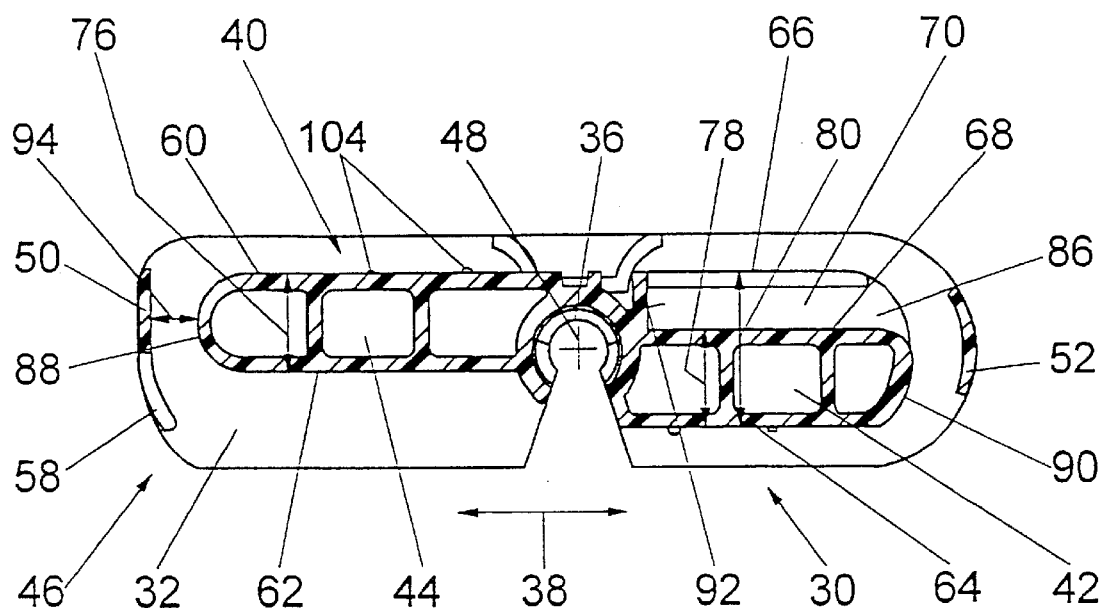
FIG. 2 shows a longitudinal section through a bearing part according to the invention corresponding to line II—II in FIG. 3.

The bearing part 30 has an elongated base body 40 with two arms 42, 44 (FIG. 2) arranged diametrically with respect to the hub 36 (FIG. 2). The hub 36 is open along a partial area of its circumference, so that it can be clipped onto the bearing pin 28. The base body 40 is mounted in a holding clip 46 so as to be rotatable coaxial to the hub 36 by a shaft-hub connection. The axis of rotation is designated by 48. The holding clip 46 which is located between the side cheeks of the center clip 22 is secured against rotation relative to the center clip 22 by lateral stops 106.

Figure 3:
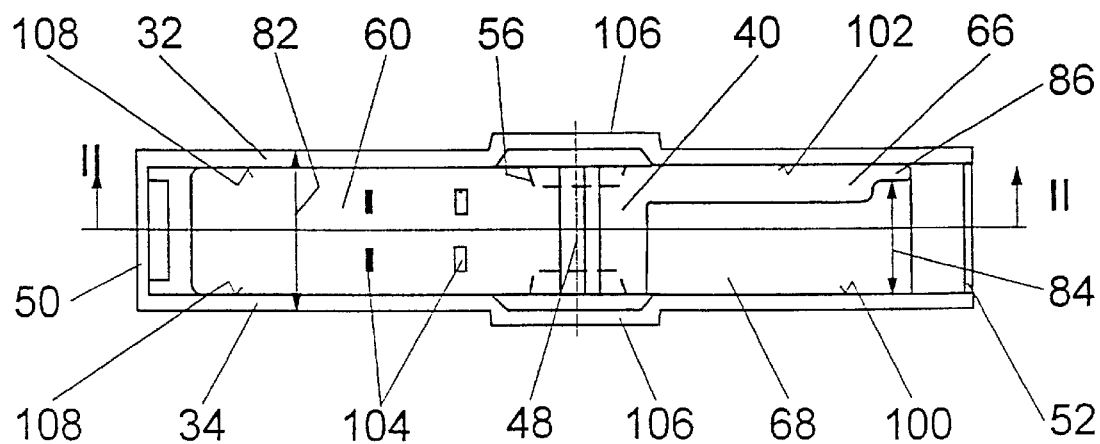
FIG. 3 is a top view of the bearing part according to FIG. 2.
Figure 4:
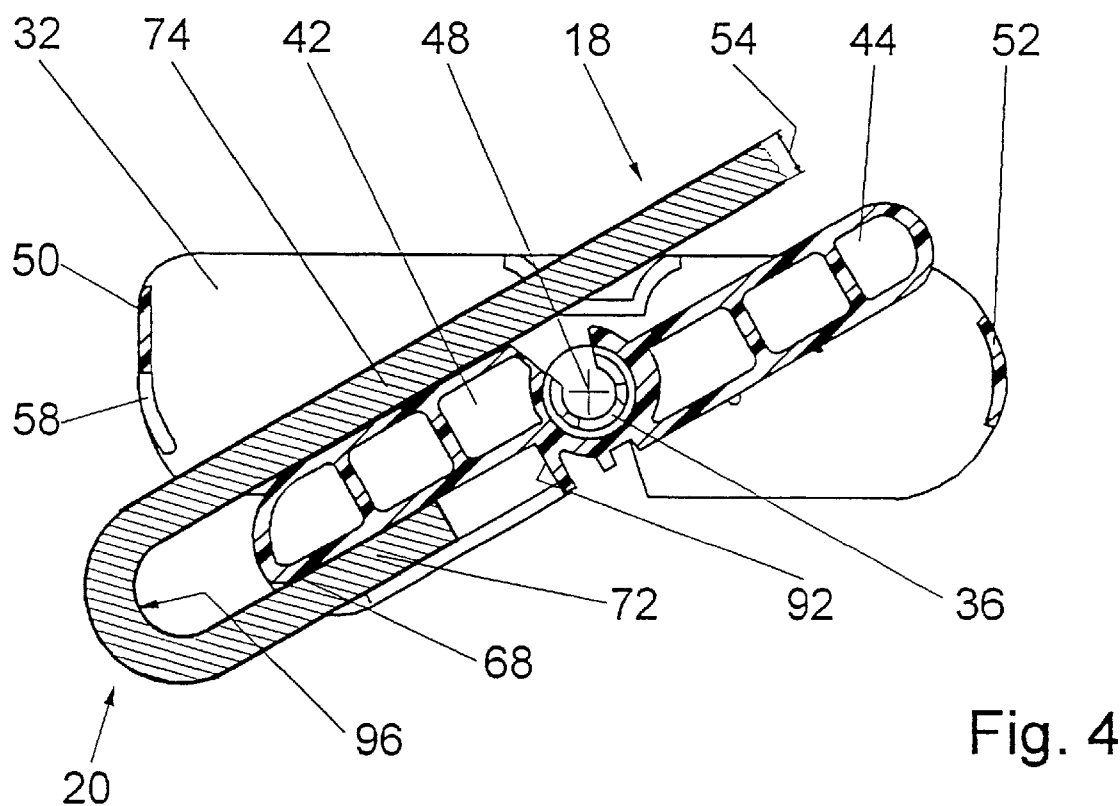
FIG. 4 shows a longitudinal section corresponding to FIG. 2 with a half-assembled bearing part at a wiper rod with a smaller width, a smaller material thickness and a smaller bending radius.
Figure 6:
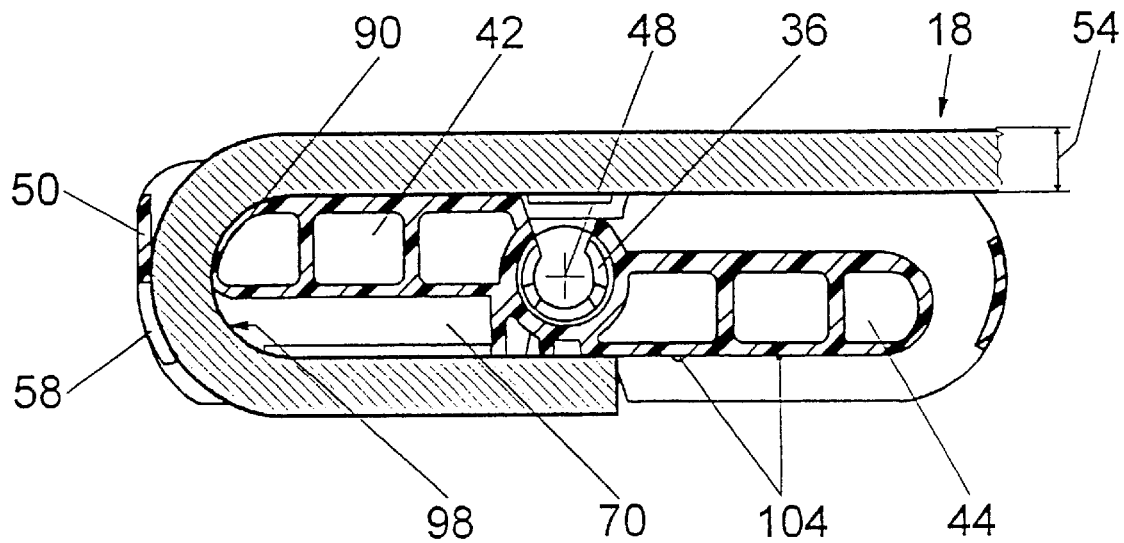
FIG. 6 shows a section corresponding to FIG. 5, but with a wiper rod with a greater width, a greater material thickness and a greater bending radius of its hook-shaped end.
Figure 7:
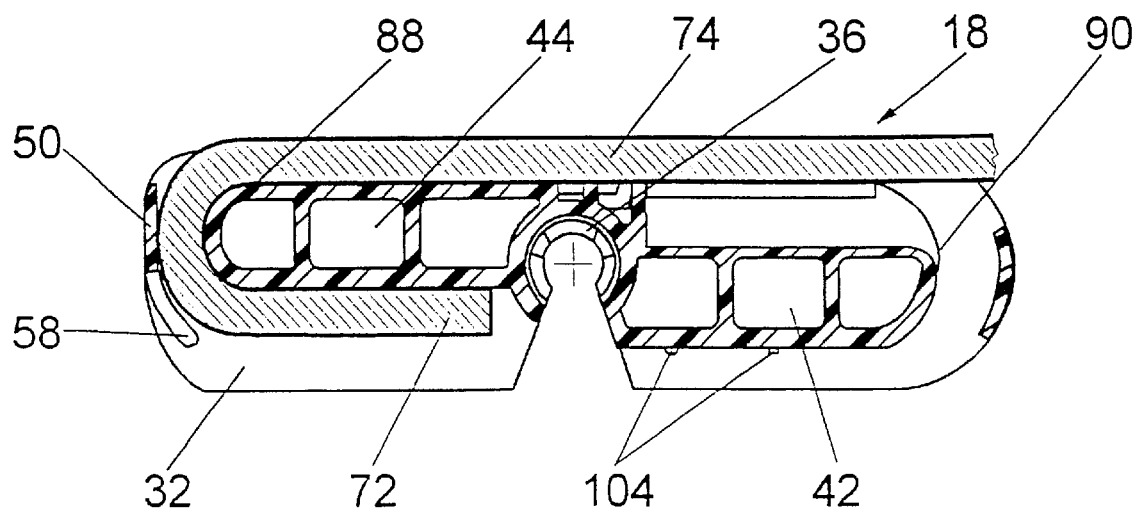
FIG. 7 shows a section corresponding to FIG. 5 with a base body which is rotated by 180° and has a wider wiper rod with a hook-shaped end with a smaller bending radius.

In order to mount the bearing part 30 at the wiper rod 18, the base body 40 is rotated relative to the holding clip 46 until the hook-shaped end 20 of the wiper rod can be slid over one of the arms 42, 44 of the base body 40. The hook-shaped end 20 contacts with the inner sides of its legs 72, 74 two of the parallel contact faces 60, 62, 64, 66, 68 which extend in the longitudinal direction 38. The distances 76, 78, 80 between cooperating contact faces are adapted to a bending radius 96, 98 and/or a material thickness 54 of the hook-shaped end 20. The bearing part 30 is accordingly suitable for hook-shaped ends 20 with different bending radii 96, 98 (FIG. 6, FIG. 7). In order to ensure contact without play, manufacturing tolerances are advisably compensated by small projections 104 which are partially sheared off and/or compressed during assembly, The contact surfaces 60, 62, 64 and 66 contact the circumferential contour of the base body 40, while the contact face 68 is formed by a cutout 70 in the base body 40 and is located between the contact face 64 and 66. The contact face 66 can cover the cutout 70 over its entire width or only partially as is shown in FIG. 3.

The hook-shaped end 20 of the wiper rod 18 is guided through lateral guides 86, 108, wherein the lateral guides 108 are formed by the side walls 32, 34 of the holding clip 46 which correspondingly project over the circumferential contour of the base body 40. The lateral guide 86 is formed by a side part of the base body 40. The distance 82, 84 of the lateral guides 108 and 86 relative to an oppositely located lateral guide is adapted to the width of a respective hook-shaped end 20. The distance 82 which is formed by the lateral guides 108 of the side walls 32 and 34 corresponds to the greatest width of a hook-shaped end 20 for which the bearing part 30 is suitable. The distance 84 between the lateral guide 86 of the base body 40 and the oppositely located lateral guide 108 at the side wall 34 of the holding clip 46 corresponds to a small width of a hook-shaped end 20. Basically, the distance 84 can also be formed by two corresponding lateral guides 86 at the base body 40. The lateral guide 86 can support the contact face 66 at the same time.

The arms 42 and 44 of the base body 40 have longitudinal stops 88, 90, 92 for the hook-shaped end 20 of the wiper rod 18. The longitudinal stops 88, 90 are formed by curved end parts of the arms 42, 44 which connect the contact faces 60 and 62 or 64 and 66. The inner side of a corresponding hook-shaped end 20 contacts the longitudinal stops 88, 90 in the area of its bending radius 96, 98 (FIG. 6 and FIG. 7). The hook-shaped end 20 of a narrower wiper rod 18 with a smaller bending radius 96 contacts, with the front side of its short leg 72, the longitudinal stop 92 formed by the end of the cutout 70. In this way, the vertex of the hook-shaped end 20 according to FIG. 5 having a smaller bending radius 96 and a smaller material thickness 54 has the same distance from the axis of rotation 48 as the vertex of the hook-shaped end 20 according to FIG. 6 which has a greater bending radius 98 and a greater material thickness 54.

The longitudinal stops 88, 90, 92 cooperate with axial stops 50 and 52 at the holding clip 46. The axial stops 50 and 52 are formed by crosspieces which connect the side walls 32 and 34. Basically, only one crosspiece 50 is required, but it is also advantageous for reasons of stability to provide a second crosspiece 52. Different distances 94 result between the axial stops 50, 52 and the longitudinal stops 88, 90, 92 at the base body 40 in the assembled state, so that wiper rods 18 whose hook-shaped ends 20 can differ in thickness 54 as well as in bending radius 96, 98 are fixed in the longitudinal direction 38. Since the longitudinal fixing does not depend on catch holes at the hook-shaped ends 20 of the wiper rods 18 and corresponding catch projections, the bearing part 30 for all hook-shaped ends 20 can be used with or without catch holes. The hook-shaped end 20 is held in this position (FIGS. 5 to 7) by a catch tongue 58 which flexibly contacts the outer curve of the hook-shaped end 20 in the assembled position. For purposes of assembling and disassembling the bearing part 30 or wiper blade 10, the flexible catch tongue 58 can be overcome and deflected when the hook-shaped end 20 is rotated about the axis of rotation 48.

The longitudinal stops 88, 90, 92 can be used in combination with the axial stop 50 of the holding clip for longitudinally securing three variants of a hookshaped end 20. If the axis of rotation 48 lies off-center between the axial stops 50 and 52, a longitudinal securing for three additional variants of a hook-shaped end with a bearing part 30 can be covered by stops 88, 90, 92 in combination with the second axial stop 52.

The bearing part 30 according to the invention can be used for wiper rods 18 with at least two different widths, material thicknesses and bending radii. Accordingly, the demand for the three most common wiper rods, namely those with a cross-sectional profile of 8×3 mm, 9×3 mm and 9×4 mm, can be met with one bearing part. It substitutes for or reduces the confusing multiplicity of bearing parts which are normally packaged along with the wiper blade 10. Further, it may already be preassembled in a customer-friendly manner and can reduce the size of the packaging in addition.

What is claimed is:

1. Bearing part (30) for an articulation of a wiper blade (10) at a hook-shaped end (20) of a wiper rod (18) of a windshield wiper, which bearing part (30) can be placed on a bearing pin (28) of the wiper blade (10) with a hub (36) which is open along a portion of its circumference, said bearing part is introduced into the hook-shaped end (20) and held by the hook-shaped end (20) in an assembled state via contact faces (60, 62, 64, 66, 68) and catch means (50, 52, 88, 90, 92), characterized in that an elongated base body (40) has two arms (42, 44) which are arranged diametrically relative to the hub (36), said base body is rotatably mounted on the hub (36) so as to be rotatable coaxial to the hub (36) in a holding clip (46) whose side walls (48, 50) project in the longitudinal direction (38) over lateral surfaces of the base body (40) and are connected with one another by at least one crosspiece (50, 52), wherein the arms (42, 44) are constructed in different ways for receiving wiper rods (18) with different hook-shaped ends (20).

2. Bearing part (30) according to claim 1, characterized in that the arms (42, 44) of the base body (40) each have at least two parallel contact faces (60, 62, 64, 66, 68) which extend in the longitudinal direction (38) and are connected by legs (72, 74) of the hook-shaped end (20), wherein a distance (76, 78, 80) between the contact faces (60, 62, 64, 66, 68) of one of the arms is different from the distance between the other of said arms.

3. Bearing part (30) according to claim 1, characterized in that at least one contact face (68) is formed by a cutout (70) in an arm (42) of the base body (40).

4. Bearing part (30) according to claim 1, characterized in that two lateral guides (86, 108) at the holding clip (46) and/or base body (40) are associated with the contact faces (60, 62, 64, 66, 68), the distance (82, 84) between these lateral guides (86, 108) being adapted to hook-shaped ends (20) with different widths.

5. Bearing part (30) according to claim 1, characterized in that the base body (40) for two respective cooperating contact faces ((60 and 62, 64 and 66, 64 and 68) has a longitudinal stop (88, 90, 92) whose distance (94) in the assembled state relative to an axial stop (50) of the holding clip (46) is so determined, depending on the bending radius (96, 98) and/or on the material thickness (54) of the respective hook-shaped end (20), that the latter is held between the longitudinal stop (88, 90, 92) of the base body (40) and the axial stop (50, 52) of the holding clip (46) in the longitudinal direction (38).

6. Bearing part (30) according to claim 5, characterized in that the axial stop (50, 52) of the holding clip (46) is formed by a crosspiece (50, 52) at a short side of the side walls (32, 34) and has a catch tongue (58).

7. Bearing part (30) according to claim 1, characterized in that the side walls (32, 34) of the holding clip (46) form lateral guide surfaces (100, 102) for the outer contact faces (60, 62, 64, 66) of the base body (40).

8. Bearing part (30) according to claim 1, characterized in that at least one contact face (60, 62, 64, 66, 68) has small projections (104) to compensate for manufacturing tolerances.

9. Bearing part (30) according to claim 1, characterized in that the holding clip (46) has a lateral stop (106) externally at the side walls (32, 34), which lateral stop (106) prevents a rotating movement relative to the wiper blade (10).

10. Bearing part (30) according to claim 1, characterized in that the holding clip (46) has an axial stop (50, 52) at its short side and the axis of rotation (48) of the hub (36) lies off-center relative to the stops (50, 52).

* * * * *